No. 723,685. PATENTED MAR. 24, 1903.
F. LAMPLOUGH.
TUBE EXPANDER.
APPLICATION FILED SEPT. 30, 1902.
NO MODEL.

Fig: 5.

Witnesses
J Green
Wm P Hammond

Inventor
Frederick Lamplough
by Knight Bros.
Attys

UNITED STATES PATENT OFFICE.

FREDERICK LAMPLOUGH, OF LONDON, ENGLAND.

TUBE-EXPANDER.

SPECIFICATION forming part of Letters Patent No. 723,685, dated March 24, 1903.

Application filed September 30, 1902. Serial No. 125,356. (No model.)

*To all whom it may concern:*

Be it known that I, FREDERICK LAMPLOUGH, a subject of the King of Great Britain, residing at London, England, have invented a new and useful Tube-Expander, of which the following is a full, clear, and exact description.

The subject of this invention is a tube-expander of simple form specially adapted for expanding tubes of small diameter.

To this end my improved tube-expanding tool consists, essentially, of a one-piece tapering shell having longitudinal slots through which project the faces of the customary expanding-rollers whose inward pressure is sustained by a central mandrel.

In my improved tool the longitudinal slots in the shell are formed with ends converging outward, and the expanding-rollers are made with conical ends and of suitable length to be confined from escape by the converging ends of the slots.

I will describe my invention by the aid of the accompanying drawings, in which—

Figure 1:
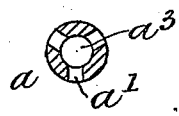
Figure 1:
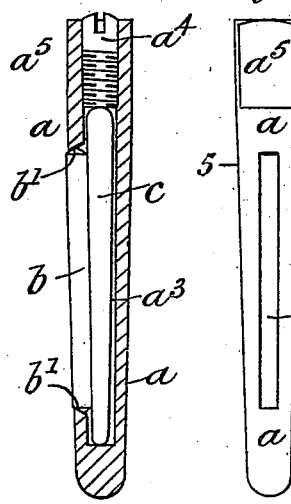
Figure 2:
Figure 4:
Figure 3:
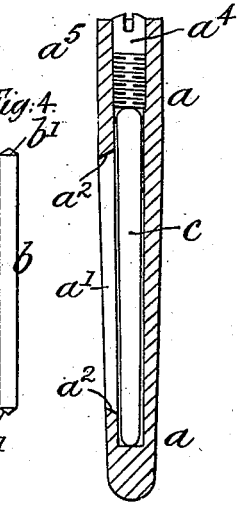

Figure 1 is a longitudinal section of the tube-expander complete. Fig. 2 is an elevation, and Fig. 3 is a longitudinal section, of the same with the outer rollers removed. Fig. 4 is an elevation of one of the outer rollers, and Fig. 5 is a cross-section of the shell of the expander on the line 5 5 of Fig. 2.

In constructing the improved tube-expander I employ a tapered shell $a$, made of a single piece of metal of circular section closed at one end and provided with longitudinal slots $a'$ to receive a series of rollers $b$. The ends $a^2$ of the slots $a'$ are beveled, and the ends $b'$ of the rollers $b$ are of conical form, so that by their coöperation the rollers $b$ are prevented from falling out of the slots $a'$. A central tapered mandrel $c$ is placed in a central boring $a^3$ of the shell $a$ between the rollers $b$ to form a bearing for the latter, and such mandrel $c$ is held in position, with freedom to rotate, by means of a screw $a^4$, just bearing on the same and screwing endwise into the head of the tapered shell $a$, while any slight amount of wear can be taken up by this screw. The head $a^5$ of the shell $a$ is squared or otherwise formed to enable the expander to be rotated by a suitable instrument applied thereto. This causes the rollers to carry around evenly, while a rotary motion is imparted to them on account of their running between the periphery of the central mandrel $c$ and the inner surface of the tube to be expanded.

Having fully described my invention, what I claim, and desire to secure by Letters Patent, is—

1. The tube-expander herein described, consisting of the one-piece tapering shell $a$, closed at its smaller end, suitably squared at its larger end for rotating it and having longitudinal slots $a'$ with beveled ends $a^2$; rollers $b$ having conical ends $b'$, of suitable length to be confined against escape by engagement of their conical ends with the beveled ends of the slots $a'$ while their faces project through said slots; a central tapering mandrel $c$ sustaining the inward pressure of the rollers $b$; and a screw-plug confining the mandrel $c$ in the shell $a$ while permitting its rotation by contact with the rollers $b$, as explained.

2. In a tube-expander, the combination of the centrally-bored shell $a$, made of a single piece of metal having bevel-ended longitudinal slots $a'$ communicating with the bore; conical-ended rollers $b$ of suitable length to fit loosely in the slots $a'$ with their faces projecting therefrom and to be confined by the bevel ends of the slots; the tapered mandrel $c$ turning freely in the shell and forming an internal bearing for the conical-ended rollers $b$; and means for retaining said mandrel within the shell with freedom of rotation, substantially as and for the purposes described.

In testimony whereof I affix my signature in presence of two witnesses.

F. LAMPLOUGH.

Witnesses:
   CLAUDE K. MILLS,
   WM. GIRLING.